United States Patent [19]
Cole

[11] Patent Number: 5,533,287
[45] Date of Patent: Jul. 9, 1996

[54] SIGN FOR STRANDED VEHICLES

[76] Inventor: Edwin L. Cole, P.O. Box 2135, Jasper, Oreg. 97438

[21] Appl. No.: 383,941

[22] Filed: Feb. 6, 1995

[51] Int. Cl.⁶ ................................................ G09F 21/04
[52] U.S. Cl. ...................... 40/591; 40/533; 40/604
[58] Field of Search ........................ 40/591, 492, 643, 40/533, 603, 604; 116/28 R; 24/115 G; 248/499, 505

[56]  References Cited

U.S. PATENT DOCUMENTS

| | | |
|---|---|---|
| 2,911,746 | 11/1959 | Frey . |
| 3,701,210 | 10/1972 | Smith . |
| 3,949,503 | 4/1976 | Waress .......................... 40/603 X |
| 4,021,948 | 5/1977 | Mosch ............................. 40/591 |
| 4,208,820 | 6/1980 | Cole ................................ 40/591 |
| 4,906,503 | 3/1990 | De La Cruz et al. . |
| 5,076,196 | 12/1991 | Chan ............................. 40/591 X |
| 5,131,290 | 7/1992 | Atkinson ..................... 24/115 G X |
| 5,263,272 | 11/1993 | Fogelman . |

*Primary Examiner*—Brian K. Green
*Attorney, Agent, or Firm*—James D. Givnan, Jr.

[57]  ABSTRACT

A sign for temporary attachment to a stranded vehicle includes a framework having upright tubular members through which elastic cords may be extracted for the purpose of sign attachment to a vehicle. Looped segments of the cords permit adjustment of cord lengths to accommodate a wide range of vehicle sizes while cord locks limit the passage of the looped cords through the upright frame members. The cords additionally serve to couple the upright frame members to horizontal frame members. A collection of sign panels are swingably supported on a horizontal frame member to permit display of the appropriate message.

5 Claims, 1 Drawing Sheet

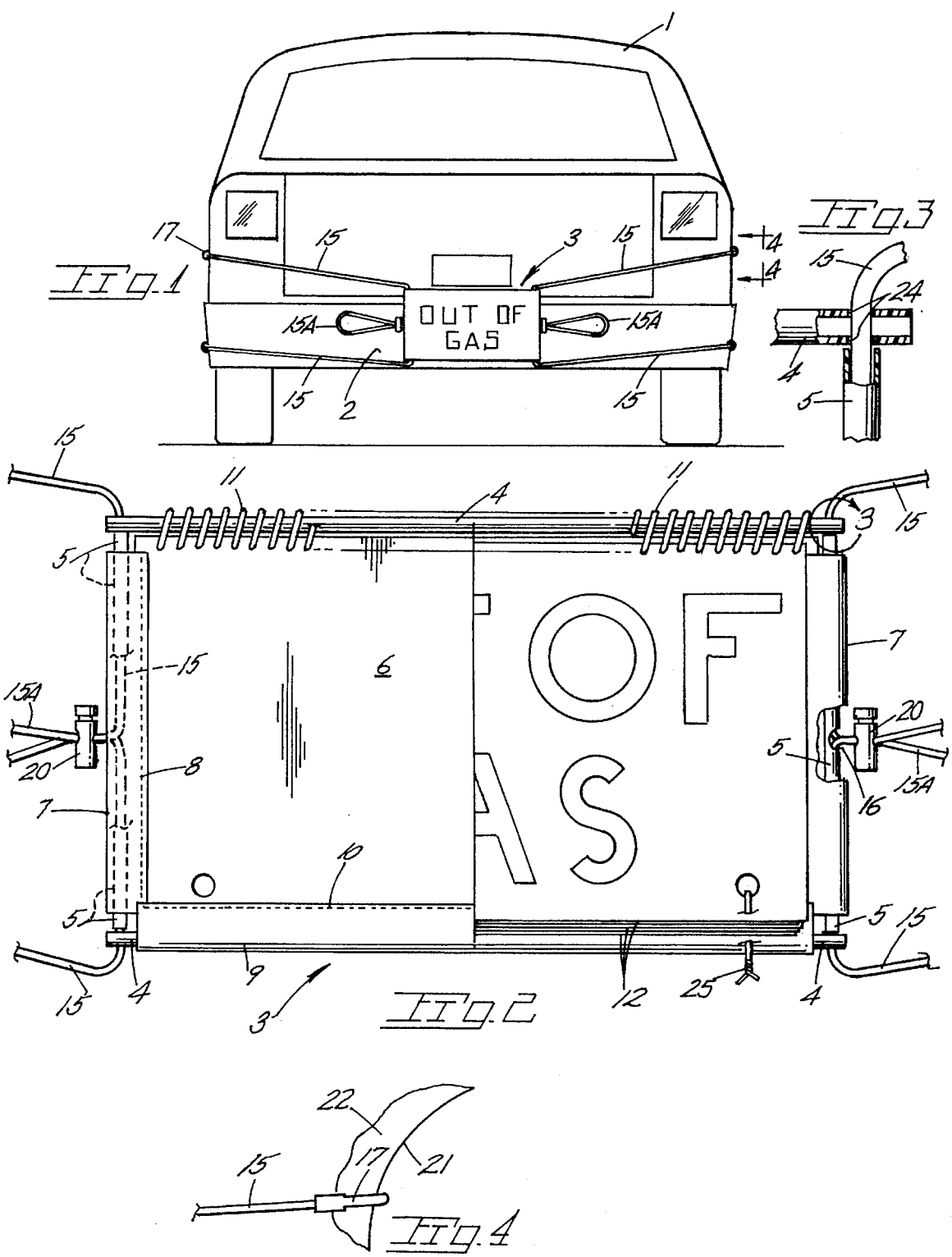

SIGN FOR STRANDED VEHICLES

BACKGROUND OF THE INVENTION

The present invention pertains generally to sign construction particularly suited for temporary installation on a vehicle to advise of the need for assistance.

Useful to motorists who have experienced an emergency situation such as a mechanical malfunction, flat tire or being out of gas, are signs temporarily attachable to the vehicle to apprise others of the problem with a view toward assistance. U.S. Pat. No. 4,208,820, issued to the present inventor, was directed toward such an objective.

Prior patents are noted which have this objective in common, which patents include, in addition to the above noted patent, U.S. Pat. No. 2,911,746 shows a banner with sleeves at its ends each having a stiffener to the ends of which a chain is attached. U.S. Pat. No. 5,263,272 shows hingedly attached composite sign panels. U.S. Pat. No. 4,906,503 shows a banner with corner attached elastic cords. U.S. Pat. No. 3,701,210 shows a panel with margin located sleeves through which straps pass for vehicular attachment.

Such signs must be adaptable to a wide range of vehicle sizes and be attachable to the vehicle in a secure manner to remain in place even when acted on by wind gusts resulting from passing vehicles. With regard to being attachable to a wide range of vehicles, this requirement is complicated by reason of the fact that contemporary automotive designs often do not provide adequate trunk lid clearances for the insertion of clips, plates, hooks, etc., on the reception of same between bumpers and car bodies as open areas therebetween do not exist or clearance therebetween does not permit insertion of an anchoring element. Still further, the wide range of current automobile sizes greatly complicates the task of providing an emergency or distress sign adaptable to all vehicles.

Important to such distress signs are the criteria of being readily attachable to a stranded vehicle without unduly exposing the stranded motorist to passing vehicles and the mounting of such a sign in a manner to withstand sudden wind gusts from passing traffic.

SUMMARY OF THE PRESENT INVENTION

The present invention is embodied within a sign for convenient attachment to a disabled automobile, or other vehicle, to apprise others of the problem encountered.

The present sign includes a framework with some of the frame members being of such construction as to permit the passage therethrough of an elastic cord fitted at its ends with a retainer for engagement with a component of the vehicle. A wide range of cord lengths may be realized by the use of looped cords and locks which permit wide adjustment of cord length to render the sign attachable to large as well as the smallest of vehicles. Cord length adjustment is permitted by the cord locks which cooperate with sign frame members to permit extensions of the cord to extend outwardly to and along the vehicle sides for vehicle attachment. The cords may also serve to couple the ends of the sign frame members in which case the ends are apertured for cord passage. Accordingly, the framework may be constructed from durable plastic tubing and without costly jointing of the frame members. One of the frame members serves to support a multitude of signs, each with a different message, enabling the vehicle operator to select the appropriate message.

Important objectives include the provision of a sign for vehicles which includes lengthly elastic cords and locking means to adapt cord length to the disabled vehicle regardless of the size of the latter; the provision of a sign for stranded motorists which may be displayed without any requirement for mechanical ability on the user's part; the provision of a sign for stranded motorists which does not rely on gaps in the vehicle body for insertion of attachment fittings.

BRIEF DESCRIPTION OF THE DRAWINGS

In the accompanying drawings:

FIG. 1 is a rear end elevational view of a stranded vehicle with the present sign in place thereon;

FIG. 2 is an enlarged elevational view of the sign of FIG. 1 with cord fragments broken away;

FIG. 3 is an enlarged detailed view of that portion of the sign encircled at 3 in FIG. 2; and FIG. 4 is an elevational view taken along line 4—4 of FIG. 1 showing a sign retainer in place on the vehicle body.

DETAILED DESCRIPTION OF THE PREFERRED EMBODIMENTS

With continuing attention to the drawings, wherein applied reference numerals indicate parts similarly hereinafter identified, the reference numeral 1 indicates the body of a stranded vehicle. An automobile bumper is at 2.

Indicated generally at 3 is a sign embodying the present invention. The sign's rectangular framework comprises horizontal members 4 and upright members 5 which are preferably of tubular plastic material which permits passage therethrough of later described elastic cords. A rear wall or panel member 6 of the sign is supported in place by the side sleeves 7 stitched at 8 to the back wall and a bottom sleeve 9 all in place about frame members 5 and lower frame member 4. Bottom sleeve 9 is stitched at 10 to the back wall member 6.

A hinge 11 is in place on upper horizontal member 4 and serves to also support back wall member 6 in place on top frame member 4 and carries a series of superimposed signs 12 each having a different message thereon such as the one illustrated, to apprise passing motorists or others of the problem encountered.

Elastic cords at 15 each pass through an upright frame member 5 via an opening 16 therein. The cord ends are equipped with hooks or other retainers at 17. To provide cords having adequate length for attachment to a wide range of vehicle sizes, a looped segment 15A of each cord extends laterally from one side of a frame member 5 and is fitted with a spring biased cord lock at 20. Accordingly the effective length of the cord may be varied to provide tensionable runs of cord from the sign to an attachment point on the vehicle, as for example, as shown in FIG. 4 the edge of a wheel opening 21 and a fender 22. The cords are preferably elastic such as bungee cords. If so desired the cords may be fitted with other retainers, e.g., U-shaped clips. Laterally disposed openings 16 in members 5 receive the cords.

Cord passage through crosswise orientated apertures 24 in the end segments of horizontal frame members 4 permits convenient assembly of the sign framework without additional corner components.

A tie at 25 prevents flapping of the sign 12 selected for display.

In use, the cords 15 are adjusted by positioning of locks 20 to permit attachment of retainers 17 to the vehicle. In certain instances it may be desirable to secure at least some of the cords to the vehicle by clamping same between a trunk lid edge and the body with final adjustment of the cords made by varying the size of looped segments 15A. Once sized to fit a specific vehicle, the sign need not be adjusted. The selection of a panel 12 is preferably made prior to sign attachment to a vehicle.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A sign for temporary attachment to a vehicle, said sign comprising, a framework including horizontal and vertical pairs of frame members, said pair of vertical frame members being of tubular construction, elastic cords one each extending in an axial manner through each of said vertical frame members with each cord having a looped portion external of its respective vertical frame member, retainers in place on the cord ends, sheets carried by said framework each bearing printed words, said elastic cords each extensible through said the pair of vertical frame members for attachment of the retainers to the vehicle, locks each on a cord looped portion-and limiting cord passage through each of said vertical frame members to permit adjustment of cord lengths for cord attachment in a snug manner to the vehicle.

2. The sign claimed in claim 1 wherein the horizontal pairs of frame members are apertured to their ends for passage of said cords.

3. The sign claimed in claim 1 wherein said locks are spring biased for locking engagement with the looped portion of each of said cords.

4. The sign claimed in claim 3 wherein the vertical pair of frame members each define an opening located therealong for the outward passage of said cords, said locks adjustable along the looped portion of each of said cords and contractible with the framework to limit cord passage through said opening.

5. The sign claimed in claim 1 additionally including a back wall member, side sleeves and a bottom sleeve attached to said back wall member.

* * * * *